Patented Dec. 10, 1940

2,224,293

UNITED STATES PATENT OFFICE 2,224,293

METHOD OF TREATING FABRICS AND OTHER MATERIALS

Donald Finlayson and Richard Gilbert Perry, Spondon, near Derby, England, assignors to Celanese Corporation of America, a corporation of Delaware No Drawing. Application October 23, 1937, Serial No. 170,604. In Great Britain November 16, 1936

2 Claims. (Cl. 91—70)

This invention relates to the treatment of filaments, yarns, fabrics, ribbons, films and like materials having a basis of organic derivatives of cellulose, and has as its principal object to provide a means of increasing the resiliency of such materials.

The resiliency of cellulosic textile materials can be increased and fabrics of such materials rendered substantially creaseless by forming a synthetic resin in the material. Similar methods applied to materials having a basis of organic derivatives of cellulose, however, have hitherto proved unsuccessful. We have now found a method whereby substantial quantities of a resinous substance can be formed within the materials and their resistance to deformation increased substantially.

According to the present invention a resinous substance is formed within the materials by applying thereto a dispersion of an intermediate condensation product or polymer of the simple substance or substances from which the resinous substance is to be formed, in a non-solvent therefor, and then carrying out polymerisation or further condensation of this intermediate product in the materials to produce the desired effect. The intermediate product should be of considerably lower molecular weight than the resinous substance to be formed. Preferably it is formed by carrying out condensation or polymerisation until the product is just insoluble in the water or other liquid in which it is to be dispersed.

The resinous substance to be formed in the materials must be a solid, relatively elastic water-insoluble substance of very high molecular weight which can readily be formed in the materials under the action of heat from a solid intermediate condensation product or polymerisation product of relatively low molecular weight which is readily dispersible.

Among the synthetic resins mention may be made of those formed by condensation of aldehydes and ketones, for example acetaldehyde, benzaldehyde, acetone and particularly formaldehyde, with amines or amides, for example urea, thiourea, guanidine, mono-methyl, mono-ethyl, methyl-ethyl, phenyl, phenyl-ethyl and phenyl-methyl urea, dicyandiamide, aniline, methyl-aniline, diphenylamine, benzyl-aniline, α-naphthylamine, para-toluene sulphonamide and other aromatic sulphonamides and N-alkyl and other derivatives thereof, phenols, particularly ordinary phenol; from carboxylic acids containing more than one carboxyl group, for example succinic and phthalic acids and alcohols containing more than one hydroxy group, for example glycol, diethylene glycol and glycerol; and from unsaturated compounds, for example acrylic acid, acrolein, and particularly vinyl alcohol and its esters. It is of advantage for the resin to have slightly basic properties.

Preferably the intermediate product is dispersed in an aqueous medium. Any suitable dispersing agent may be used. Among the most useful are sulphonated bodies and sulphuric esters of high molecular weight such for example as sulphonated mineral oils, aromatic sulphonic acids, sulphonated fatty oils, sulphonated fish oils, alkylated poly-nuclear sulphonic acids, Twitchell's reagent, sulpho-naphthalene ricinoleic acid and like acid sulphonation products of mixtures of higher aliphatic acids with aromatic hydrocarbons, and sulphonation products of higher aliphatic acids or higher aliphatic alcohols, e. g. Turkey red oil and sulpho-ricinoleic acid. The acids may be used in the form of their water-soluble salts, particularly sodium salts, unless, as indicated below, they are required to act as catalysts for the resin formation. Other dispersing agents which can be used include water-soluble soaps, e. g. the sodium, potassium and alkylolamine salts of oleic, stearic and palmitic acid and water-soluble cellulose derivatives, e. g. methyl cellulose, cellulose sulphate and sulphite cellulose lye. When soaps are used they may with advantage be formed in situ by treating the intermediate product first with the free acid and then adding the base. One method of making the dispersion is to heat the components of the resinous substance together at an appropriate temperature in aqueous solution and if necessary, in the presence of a catalyst, until an intermediate product insoluble in water is produced. The dispersing agent may then be added and dispersion effected by stirring. Vigorous mechanical action such as that of the colloid mill is in general unnecessary to produce the desired dispersion and is preferably avoided. It is in some cases better to filter off the intermediate product, add a relatively large proportion of the dispersing agent or form the same in situ, and after forming the dispersion add water to give the desired dilution. It is not, however, essential that the intermediate product should separate out as a precipitate at any stage; this can be avoided by having the dispersing agent present during the formation of the intermediate product. The preferred method involves taking advantage of the acidity of an acid dispersing agent to catalyse the resin formation, in the absence of substantial amounts of other catalysts.

The dispersion may be applied to the materials in any convenient way. For example they may be immersed in a bath containing the dispersion. A very convenient method when fabrics are treated is to pad them with the dispersion and batch until the desired absorption has taken place. It is of advantage to restrain shrinkage of the materials during the treatment without, however, subjecting them to any considerable tension. Local effects may be produced by local application of the dispersion, for example by printing methods. When the desired amount of the intermediate product has been absorbed by the materials, excess of the dispersion adhering to the exterior of the filaments may be removed by washing and polymerisation or further condensation of the intermediate product to form the desired resinous substance may then be effected by the application of heat to the material.

When a catalyst other than the dispersing agent is required to assist the condensation or polymerisation resulting in the formation of the resinous substance, it may be introduced with the intermediate product or at a later stage, for example immediately before the polymerisation or condensation takes place. Acid, alkaline or neutral catalysts may be used but care must be taken to limit the quantity of acid or alkaline substances used as catalysts with a view to avoiding substantial saponification in the case of cellulose esters and degradation in the case of organic derivatives of cellulose generally, and the choice of catalyst must be made with due regard to the nature of the dispersing agent used. Among acid catalysts which may be used are phosphoric acid, boric acid, lactic acid, ferric chloride and other acid-reacting metal halides. As indicated above the dispersing agent may itself function as a catalyst both for the formation of the intermediate product and for the subsequent polymerisation or condensation of this in the materials.

The condensation or polymerisation is effected by the application of heat to the materials containing the resin-forming substance or substances. This may be effected by passing the material through a heated atmosphere or over heated rolls. A very convenient apparatus for this purpose is one similar to the agers used in dyeing but provided with means for obtaining a higher temperature than is usually reached in such machines. In the case of phenol formaldehyde resins and most of the other resins specified, temperatures between 110° and 180° C., for example 120° to 140° or 170° C., will be found most suitable. Naturally the temperature must not be sufficiently high to damage the materials.

The following examples illustrate the invention:

*Example 1*

In a 10% aqueous solution of formaldehyde there is dissolved an equimolecular proportion of urea. 4-5% of Turkey red oil is mixed into this solution. During the addition of the Turkey red oil a white precipitate is formed which subsequently becomes dispersed to form a colloidal solution. This solution is diluted to half strength. A fabric of cellulose acetate artifical silk is immersed in the solution for 15-20 minutes; mangled until it retains about is own weight of the solution, dried at 50-60° C. and heated for 15-30 minutes at a temperature between 120-160° C. The material is then washed thoroughly and dried. During the whole process the material is held in such a way that shrinkage is prevented without imposing any considerable tension on the material.

*Example 2*

The process is carried out as described in Example 1, except that instead of Turkey red oil, sulpho-naphthalene ricinoleic acid is used.

*Example 3*

The process is carried out as described in Example 1 or 2 except that two molecular proportions of formaldehyde are employed for one of urea and after addition of the Turkey red oil or sulpho-naphthalene ricinoleic acid, the solution is boiled for 5 minutes.

*Example 4*

The process is carried out as described in Example 3, except that the urea and the formaldehyde are boiled together before addition of the Turkey red oil or sulpho-naphthalene ricinoleic acid until a sample of the resulting solution forms a precipitate on cooling.

By methods similar to those of the preceding examples the process can be carried out using instead of urea, dicyandiamide, thiourea or phenol.

The invention is of special importance in connection with the treatment of textile materials having a basis of cellulose acetate. The process of the invention is also applicable, however, to other materials including films, foils and ribbons having a basis of organic esters or ethers of cellulose, for example organic esters such as cellulose formate, propionate and butyrate, mixed organic and inorganic esters such as cellulose nitrate acetate, cellulose acetate propionate, cellulose acetate propionate butyrate and cellulose nitrate acetate propionate, simple ethers such as ethyl-, methyl-, propyl-, and benzyl-celluloses and other esters such as ethyl cellulose acetate and oxyethyl cellulose acetate. The invention is not limited to the treatment of esters or ethers of any particular ether or ester content. Thus, in the case of organic esters of cellulose, the acidyl value may range from less than that corresponding to a mono-ester to that corresponding to a tri-ester. In the case of lower organic esters of cellulose, however, the most useful results have been obtained with esters of acidyl content ranging from 1 to 2½ acidyl groups per $C_6H_{10}O_5$ unit.

One of the most useful applications of the process of the invention is in the treatment of fabrics of organic derivatives of cellulose. By such treatment the resistance of the fabrics to creasing may be greatly increased. Effects such as embossing produced by mechanical treatment may be rendered more permanent, the affinity of the fabrics for cotton dyes may be increased and the resistance of the materials to water may be increased. The effects produced may extend over the whole fabric or may be local, localisation of the effect being produced by localised polymerisation of the resin. Similar effects may be produced on films, ribbons and yarns. Thus, for example, crimped effects in yarns may be rendered more permanent by the treatment of the invention and the invention includes effecting the polymerisation after or in the course of a process designed to produce crimped threads, for example by imparting false twist to the running threads or during a process for producing crinkled ribbons.

The permanence of the effects obtainable by the process of the invention may be still further increased by treatment of the materials, at a suitable stage, for example after the removal of the dispersion adhering to the outside of the material, with a composition adapted to render them even more resistant to wetting, this may be effected, for example, by coating the materials with wax-like substances applied in solution in liquids, for example hydrocarbons or chlorinated hydrocarbons.

Having described our invention, what we desire to secure by Letters Patent is:

1. Process for improving the resilience of filaments, fibres, yarns, fabrics and like materials having a basis of an organic derivative of cellulose selected from the group consisting of cellulose esters of lower fatty acids and cellulose ethers, which comprises causing the filaments or fibres of the material to absorb water-insoluble intermediate condensation product of urea and formaldehyde, from an aqueous dispersion of said condensation product containing a dispersing agent which is a sulphonation product of a mixture of a higher aliphatic acid with an aromatic hydrocarbon and converting said condensation product into a water-insoluble synthetic resin in the materials by heating the materials, said dispersing agent being the sole catalyst for the conversion.

2. Process for improving the resilience of filaments, fibres, yarns, fabrics, and like materials having a basis of cellulose acetate, which comprises causing the filaments or fibres of the material to absorb water-insoluble intermediate condensation product of urea and formaldehyde, from an aqueous dispersion of said condensation product containing sulpho-naphthalene ricinoleic acid as dispersing agent and converting said condensation product into a water-insoluble synthetic resin in the materials by heating the materials, said dispersing agent being the sole catalyst for the conversion.

DONALD FINLAYSON.
RICHARD GILBERT PERRY.